United States Patent
Kim et al.

(10) Patent No.: US 11,393,381 B2
(45) Date of Patent: Jul. 19, 2022

(54) VEHICLE AND IMAGE DISPLAY METHOD FOR PREVENTING DISPLAY COLOR DISTORTION ACCORDING TO A VIEW ANGLE OF A DRIVER

(71) Applicants: Hyundai Motor Company, Seoul (KR); Kia Motors Corporation, Seoul (KR)

(72) Inventors: Hyeo Jin Kim, Seoul (KR); Woo Jin Hwang, Hwaseong-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 17/114,496

(22) Filed: Dec. 8, 2020

(65) Prior Publication Data

US 2021/0390897 A1    Dec. 16, 2021

(30) Foreign Application Priority Data

Jun. 16, 2020   (KR) .................. 10-2020-0073028

(51) Int. Cl.
*G09G 3/20*      (2006.01)
*G09G 3/3208*    (2016.01)
*B60K 35/00*     (2006.01)

(52) U.S. Cl.
CPC .......... *G09G 3/2003* (2013.01); *B60K 35/00* (2013.01); *G09G 3/3208* (2013.01); *B60K 2370/149* (2019.05); *B60K 2370/152* (2019.05); *B60K 2370/21* (2019.05); *B60K 2370/332* (2019.05); *G09G 2320/0242* (2013.01); *G09G 2320/0666* (2013.01); *G09G 2354/00* (2013.01); *G09G 2380/10* (2013.01)

(58) Field of Classification Search
None
See application file for complete search history.

(56) References Cited

U.S. PATENT DOCUMENTS

2004/0247201 A1*  12/2004  Arazaki ............. H04N 9/04517
                                                    382/275
2014/0146069 A1*   5/2014  Tan .......................... G06F 3/011
                                                    345/589

FOREIGN PATENT DOCUMENTS

| CN | 107807806 A | * | 3/2018 | |
| GB | 2366063 A | * | 2/2002 | ........... G09G 3/3611 |
| JP | 2021113842 A | * | 8/2021 | |

* cited by examiner

*Primary Examiner* — Patrick F Valdez
(74) *Attorney, Agent, or Firm* — Morgan, Lewis & Bockius LLP

(57) ABSTRACT

An image display method for preventing display colors from being distorted according to a viewing angle of a driver, and an image display method for a vehicle may include: tracking a sight line of a driver; determining an angle formed between a display and the sight line of the driver; loading a gain value corresponding to the determined angle from a prestored gain compensation table; applying the loaded gain value to image data displayed on the display; and displaying the image data to which the gain value has been applied on the display.

13 Claims, 8 Drawing Sheets

FIG. 7

| | 1 | | | | | | | 1920 | |
|---|---|---|---|---|---|---|---|---|---|
| | 1.0 | 1.0 | 1.01 | ~ | 1.08 | 1.08 | 1.09 | 1.09 | |
| | 1.01 | 1.01 | 1.02 | ~ | 1.09 | 1.09 | 1.10 | 1.11 | |

⋮

| | 1.58 | 1.58 | 1.59 | ~ | 1.66 | 1.66 | 1.67 | 1.67 | |
| | 1.59 | 1.59 | 1.60 | ~ | 1.67 | 1.67 | 1.68 | 1.68 | $\frac{59}{60}$ s |
| | 1.60 | 1.60 | 1.61 | ~ | 1.68 | 1.68 | 1.69 | 1.69 | 1s | ic # VEHICLE AND IMAGE DISPLAY METHOD FOR PREVENTING DISPLAY COLOR DISTORTION ACCORDING TO A VIEW ANGLE OF A DRIVER

The present application claims priority to Korean Patent Application No. 10-2020-0073028, filed on Jun. 16, 2020, the entire contents of which is incorporated herein for all purposes by this reference.

BACKGROUND OF THE INVENTION

Field of the Invention

The present invention relates to a vehicle and an image display method therefor for preventing display colors from being distorted according to a viewing angle of a driver.

Description of Related Art

To support and improve functions of a vehicle, various types of displays are provided in the vehicle. For example, a navigation system which is provided in a vehicle and provides guidance of a route to a destination is widely used.

The navigation system is an apparatus which matches a route from a current position to a destination set by a driver to map information and provides the route. The navigation system tends to be provided with a high-performance display to provide various types of information for convenience of a driver as well as displaying route information. Accordingly, an organic light emitting diode (OLED) display having a higher response speed and higher brightness and contrast than a conventional liquid crystal display apparatus is increasingly attracting attention.

In the case of an OLED display, a microcavity in which a cathode and an anode are formed of a metal material having an emission layer formed therebetween to improve optical efficiency is applied in many cases. In an OLED display to which the microcavity structure is applied, colors are different at the front and side of a panel when a viewing angle moves from the front to the side, which causes color shift and decreases color reproducibility of R, G and B.

However, since the display of a navigation system provided in a vehicle is provided on the side in the line of sight of a driver, definition inevitably deteriorates according to a viewing angle when an OLED display is used as a display of a navigation system.

The information included in this Background of the present invention section is only for enhancement of understanding of the general background of the present invention and may not be taken as an acknowledgement or any form of suggestion that this information forms the prior art already known to a person skilled in the art.

BRIEF SUMMARY

Various aspects of the present invention are directed to providing a vehicle and an image display method therefor which can prevent display colors from being distorted according to the viewing angle of a driver.

Various aspects of the present invention are directed to providing a vehicle and an image display method therefor which can prevent expression of unintended colors according to the viewing angle of a driver when a navigation system employing an OLED is used.

Various aspects of the present invention are directed to providing a vehicle and an image display method therefor which can prevent color shift and luminance deterioration according to a viewing angle and improve color reproducibility and external visibility when an OLED having a microcavity is applied due to variation in the viewing angle of a driver according to the position of the driver.

It will be appreciated by persons skilled in the art that the objects that could be achieved with the present invention are not limited to what has been described hereinabove and the above and other objects that the present invention could achieve will be more clearly understood from the following detailed description.

To achieve these objects and other advantages and in accordance with the present invention, as embodied and broadly described herein, an image display method for a vehicle includes: tracking a sight line of a driver; determining an angle formed between a display and the sight line of the driver; loading a gain value corresponding to the determined angle from a prestored gain compensation table; applying the loaded gain value to image data displayed on the display; and displaying the image data to which the gain value has been applied on the display.

In another aspect of the present invention, a vehicle includes: a display for displaying image data; a sight-line tracking unit for tracking a sight line of a driver; an angle calculation unit configured for determining an angle formed between the display and the sight line of the driver; a gain compensation table of storing gain values applied in a response to the angle formed between the display and the sight line of the driver; and a display controller configured for loading a gain value corresponding to the angle determined by the angle calculation unit among the stored gain values of the gain compensation table, applying the gain value to the image data and displaying the image data to which the gain value has been applied on the display.

The vehicle and the image display method therefor according to at least various exemplary embodiments of the present invention configured as above can prevent display colors from being distorted due to a viewing angle problem by compensating for the display colors in real time in a response to the viewing angle of a driver.

Furthermore, the present invention can prevent expression of unintended colors according to the viewing angle of a driver when a navigation system employing an OLED display is used.

Furthermore, the present invention can prevent color shift and luminance deterioration according to a viewing angle and improve color reproducibility and external visibility when an OLED having a microcavity is applied due to variation in the viewing angle of a driver according to a position of the driver.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 7 is a diagram for describing a method of compensating for image data through an image display method according to various exemplary embodiments of the present invention.

Figure 1:
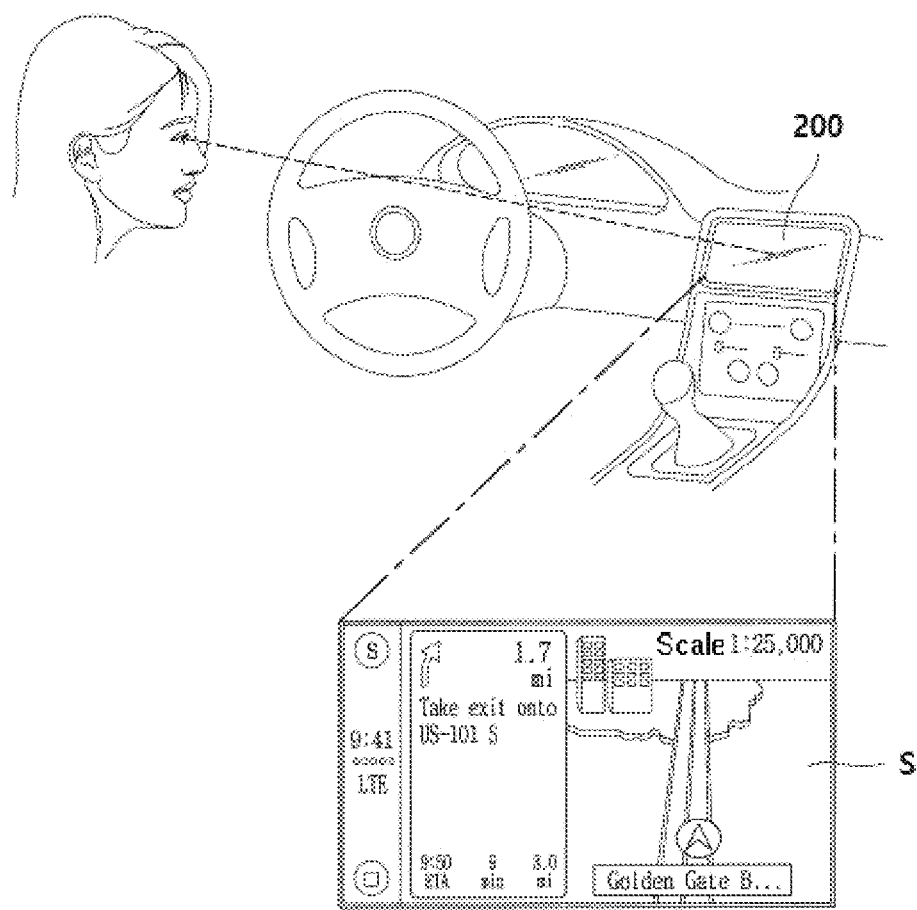
FIG. 1 is a diagram showing an example of a vehicle according to various exemplary embodiments of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the contrary, the present invention(s) is/are intended to cover not only the exemplary embodiments of the present invention, but also various alternatives, modifications, equivalents and other embodiments, which may be included within the spirit and scope of the present invention as defined by the appended claims.

The detailed description of the exemplary embodiments of the present invention will be provided to enable those skilled in the art to implement and practice the present invention with reference to the appended drawings. However, the present invention may be implemented in various different forms and is not limited to exemplary embodiments described herein. In addition, parts that are not related to description will be omitted for clear description in the drawings, and the same reference numbers will be used throughout this specification to refer to the same or like parts.

Throughout the specification, when it is said that some portion "includes" a specific element, this means that the portion may further include other elements, not excluding the same, unless mentioned otherwise. Furthermore, the term "-er(or)", "module", "portion" or "part" is used to signify a unit for performing at least one function or operation, and the unit may be realized as hardware, software, or a combination thereof.

Throughout the specification, when it is said that some part "includes" a specific element, this means that the part does not exclude other elements but further includes such other elements since the corresponding elements may be included unless mentioned otherwise. In addition, the same or similar elements are designated by the same reference numerals throughout the specification.

Hereinafter, embodiments of the present description will be described with reference to the appended drawings. In the following description, if a detailed description of known techniques associated with the present description would unnecessarily obscure the gist of the present description, detailed description thereof will be omitted. The names of components used in the description are selected in consideration of ease of description and may differ from the names of parts of actual products.

FIG. 1 is a diagram showing an example of a vehicle according to various exemplary embodiments of the present invention.

As shown in FIG. 1, a display 200 which displays a navigation screen S may be provided in the vehicle. The display 200 for navigation may be provided between a driver's seat and a passenger seat.

This display 200 may employ an OLED display. An OLED has a structure in which an organic emission layer is formed between a cathode for injecting electrons and an anode for injecting holes. A microcavity structure may be applied to an OLED display for optical efficiency improvement. A microcavity is a structure in which a cathode is formed of a metal material to be used as a reflection electrode, an anode is formed in a layered structure of an indium tin oxide (ITO) layer and an Ag layer, and an optical cavity is formed between the cathode and the anode.

In an OLED display employing the microcavity structure, an optical path difference (OPD) between constructive lights decreases and a constructive wavelength range moves in a short wavelength direction when a viewing angle moves from the front to the side of the display panel. Accordingly, colors are different at the front and side of the panel and thus may lead to color shift. The present invention is devised to solve such a color shift problem and proposes a method of compensating for RGB image data by applying a gain in real time in a response to the position of a driver.

Figure 2:
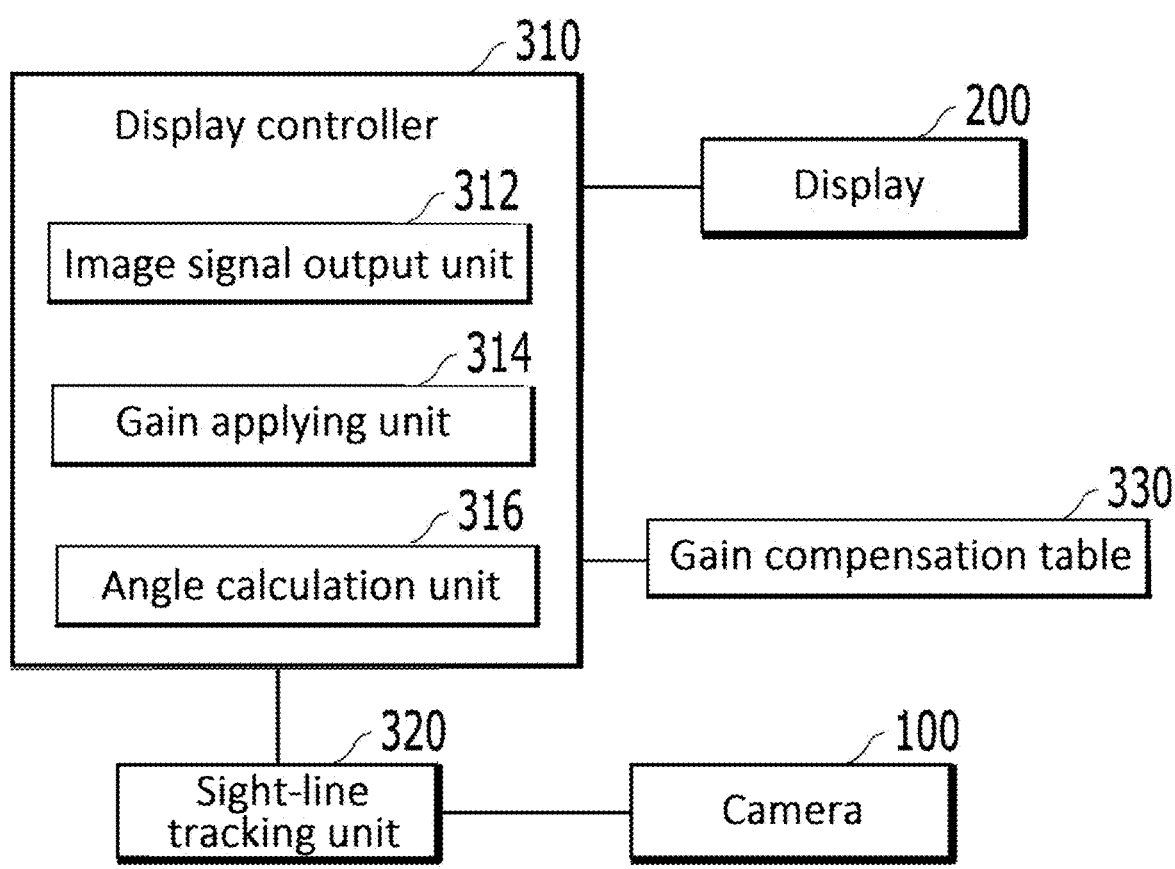
FIG. 2 is a block diagram of the vehicle according to various exemplary embodiments of the present invention.

FIG. 2 is a block diagram showing an example of a configuration of the vehicle according to various exemplary embodiments of the present invention, focusing on components pertaining to exemplary embodiments of the present invention.

Referring to FIG. 2, the vehicle according to various exemplary embodiments of the present invention includes the display 200 which displays image data, a camera 100 which captures an image of a driver, a sight-line tracking unit 320, a gain compensation table 330, and a display controller 310 which controls these components.

The display 200 can display navigation information and various types of information for driver convenience. The display 200 of the exemplary embodiment may be an OLED display to which the microcavity structure is applied.

The camera 100 captures an image of the face of a driver sitting on the driver's seat and provides the image to the sight-line tracking unit 320.

The sight-line tracking unit 320 tracks a movement of the face and movement of the pupils of the eyes of the driver from the face image of the driver. The sight-line tracking unit 320 can determine a position of the sight line of the driver in real time by performing sight-line tracking, that is, eye tracking. The sight-line tracking unit 320 can detect movement of the pupils of the eyes through analysis of an image captured by the camera 100 and determine the sight line of the driver from the detected movement. Although a method of tracking a sight line through video analysis using a camera has been described in various exemplary embodiments of the present invention, eye tracking techniques such as a contact lens method and a sensor attachment method may be applied.

Figure 3:
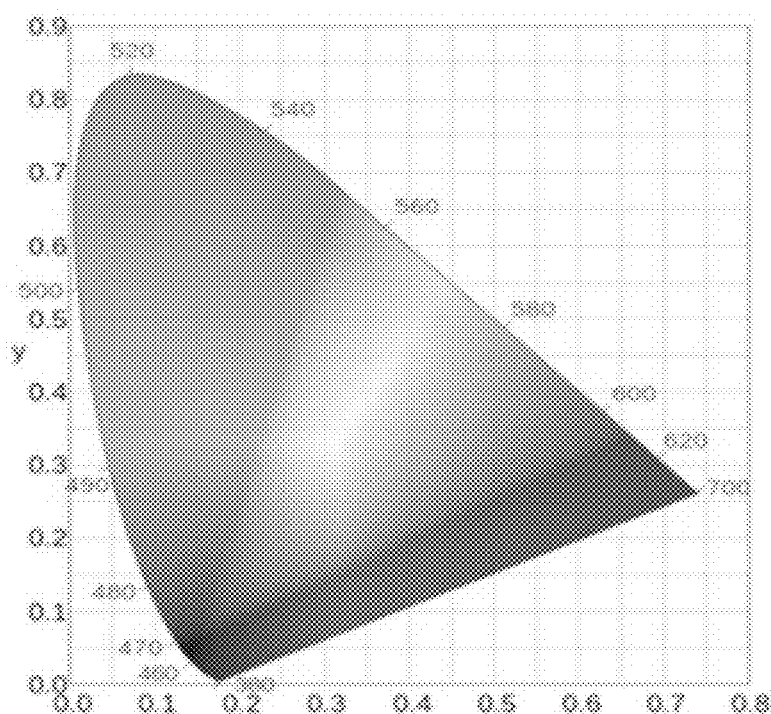
FIG. 3 is a CIE 1931 coordinate system.

The gain compensation table 330 stores gain values according to angles formed between the display 200 and the sight line of the driver. The gain compensation table 330 stores gain values for correcting color shift of the display 200 for respective viewing angles. For example, in the case of a resolution of 1920×720, gains of 1920×(0° to) 90°×(3 (R, G, B)×viewing angle of 1°) may be stored per pixel. Gain compensation entails controlling gains of RGB data to realize a desired color, and a correction value may be set with reference to the CIE 1931 coordinate system that is a generally used color coordinate system. FIG. 3 shows the CIE 1931 coordinate system. Referring to FIG. 3, if reddish color coordinates of (0.34, 0.32) are measured when data of (128, 128, 128) is input, color change may be corrected to (128, 140, 140) and white (0.31.32) by adding a gain of 10% to green (G) and blue (B). The gain compensation table 330 may be stored in a timing controller included in the display 200 or an H/U memory. Furthermore, in the gain compensation table 330, angles formed between the display 200 and the driver may include angles in the horizontal direction and angles in the vertical direction thereof. Accordingly, gain values according to angles in the horizontal direction thereof, gain values according to angles in the vertical direction thereof, and gain values according to combinations of angles in the horizontal direction and the vertical direction may be stored in the gain compensation table 330. For example, in the case of horizontal compensation, 90 gain values in units of 1° in the range of 0° to 90° on the basis of the driver may be stored. When vertical compensation is required, 180 gain values in units of 1° in the range of −90° to 90° in the vertical direction may be stored. Accordingly, color compensation at angles of 0° to 90° in the horizontal direction and angles of −90° to 90° in the vertical direction may be performed according to combinations of 90 gain values in the horizontal direction and 180 gain values in the vertical direction thereof. Here, to minimize data of the gain compensation table 330, it is possible to limit an effective angle between the driver and the display to the range of 10° to 70° in the horizontal direction and the range of −60° to 20° in the vertical direction thereof. The size of the gain compensation table 330 may be reduced to 1×2 or 1×4 in consideration of memory efficiency, and a gain of 2×2 or 4×4 may be applied when a gain is applied per frame.

The display controller 310 determines an angle formed between the display 200 and the sight line of the driver on the basis of tracking results of the sight-line tracking unit 320, loads a gain value corresponding to the determined angle from the gain compensation table 330, applies the gain value to image data and displays the image data to which the gain value is applied on the display 200. The display controller 310 which executes this control function may include an image signal output unit 312, a gain applying unit 314, and an angle calculation unit 316.

The angle calculation unit 316 can determine angles between the sight line of the user according to the tracking results of the sight-line tracking unit 320 and the center point of the display 200 in the horizontal direction and the vertical direction thereof.

The gain applying unit 314 can load gain values corresponding to the angles determined by the angle calculation unit 316 from the gain compensation table 330 and apply the loaded gain values to image data. A flash memory may be used for the gain compensation table 330 and an SRAM may be used for the gain applying unit 314. The gain applying unit 314 may perform only horizontal compensation or vertical and horizontal compensation in a response to the aspect ratio of the display 200. For example, in the case of monitors with aspect ratios of 24:9 and 32:9, the vertical lengths are short and thus the influence of color change in the vertical direction is insignificant. Accordingly, only horizontal compensation may be performed on such displays. The gain applying unit 314 can apply a gain value corresponding to the horizontal angle between the display 200 and the sight line of the driver to only one line and apply a gain value corresponding to the vertical angle in frame units. Here, when the gain applying unit 314 applies a gain in units of 2° instead of applying a gain in units of 1° and performs linear interpolation, the size of the gain compensation table 330 may be minimized to conserve the memory. Meanwhile, when the position of the driver rapidly changes, color compensation values are large and thus a sense of difference may be perceived. Accordingly, the gain applying unit 314 can minimize the sense of difference by sequentially controlling gain values by driving frequency steps for one second. Furthermore, when compensation is applied even when the position of the driver slightly changes, frequency compensation may cause a sense of difference. Accordingly, minute movement, for example movement of about +/−5° may be set as a reference value on the basis of a current angle and compensation may be performed only for movement equal to or greater than the reference value. In addition, continuous minute movement may be detected, and when variation of +/−5° from an initial position occurs, the current position may be updated and then gain values may be applied to minimize a sense of difference due to frequent compensation.

The image signal output unit 312 can output the image data to which gain values are applied in the gain applying unit 314 to the display 200.

According to the present configuration, the vehicle according to the exemplary embodiment of the present invention can apply a gain in real time in a response to the position of the driver, compensate for colors of image data and then display the compensated image data on the display 200. Accordingly, a problem that unintended colors are expressed due to an angle difference between the display 200 and the sight line of the driver may be solved.

Figure 4:
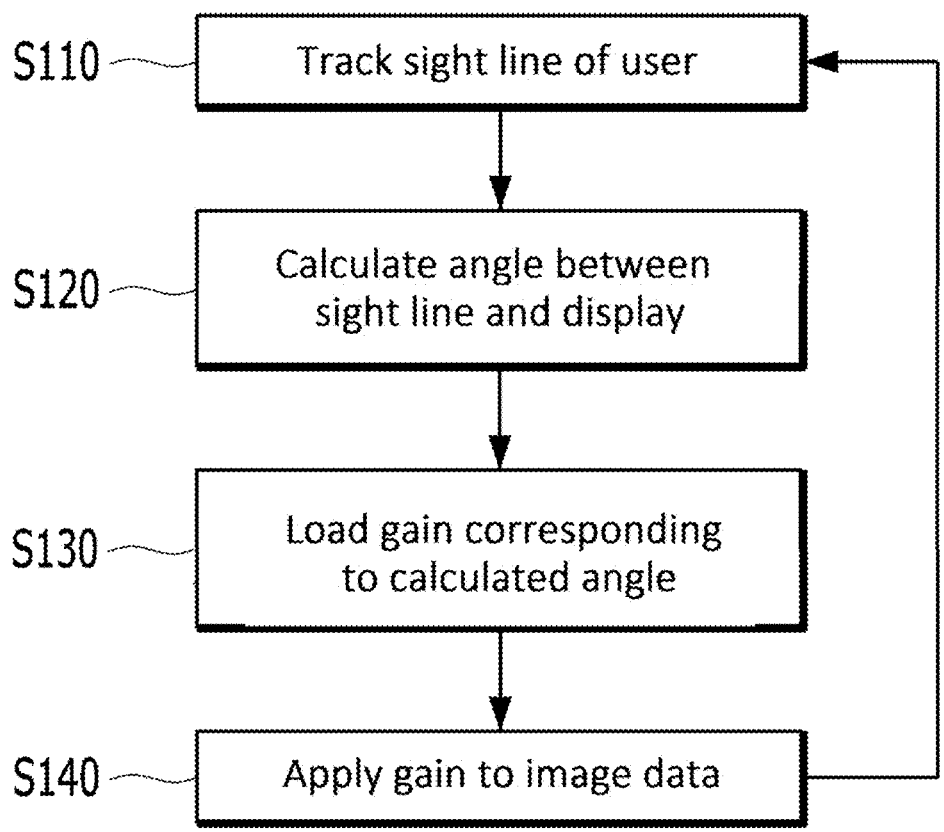
FIG. 4 is a flowchart for describing an image display method according to various exemplary embodiments of the present invention.

FIG. 4 is a flowchart for describing an image display method according to various exemplary embodiments of the present invention.

Referring to FIG. 4, the sight-line tracking unit 320 tracks a sight line of a driver in real time and outputs tracking results (S110). The sight-line tracking unit 320 can track variation in the sight line of the driver in real time using a method such as image analysis, the contact lens method, or the sensor attachment method.

The angle calculation unit 316 of the display controller 310 determines an angle formed between the sight line of the driver and the display 200 on the basis of the tracking results of the sight-line tracking unit 320 (S120). The angle calculation unit 316 may determine an angle between the sight line of the driver and the center point of the display 200 in the horizontal direction or the vertical direction thereof.

The gain applying unit 314 of the display controller 310 loads a gain value corresponding to the angle determined in the angle calculation unit 316 from the gain compensation table 330 (S130).

The display controller 310 can apply the loaded gain to image data and display the color-compensated image data on the display 200 (S140).

Figure 5:
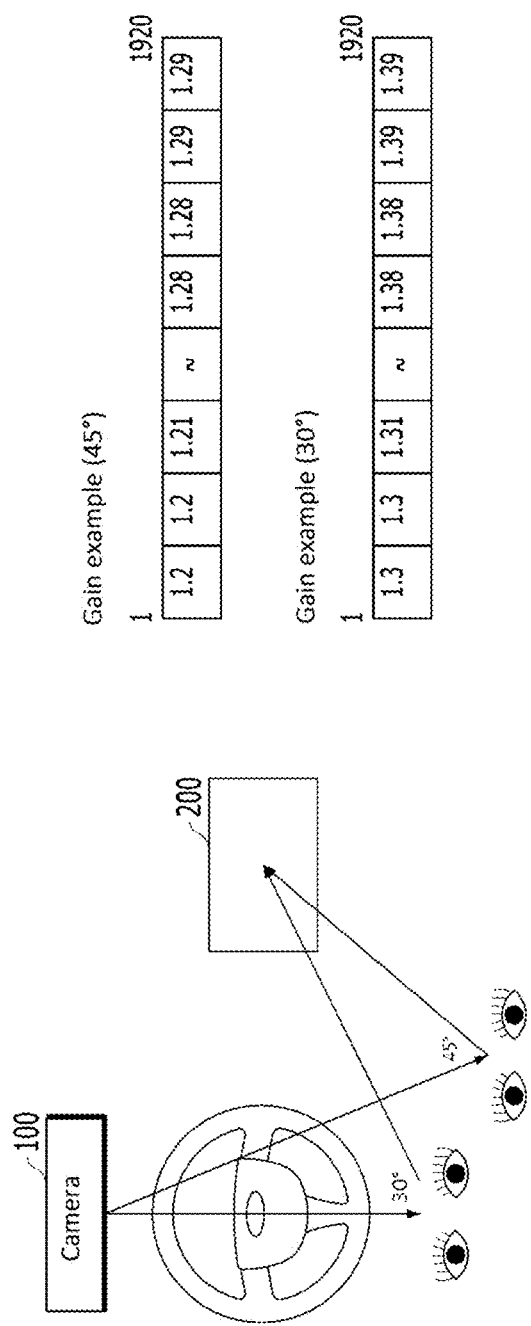
FIG. 5 is a diagram for describing a method of compensating for image data through an image display method according to various exemplary embodiments of the present invention.

FIG. 5 is a diagram for describing a method of compensating for image data through an image display method according to various exemplary embodiments of the present invention and illustrates a case in which colors are compensated in the horizontal direction thereof.

When the display 200 has an aspect ratio of 24:9 or 32:9, the vertical length is short and thus color change in the vertical direction is insignificant. Accordingly, only horizontal compensation may be performed on this display. In the case of horizontal compensation, 90 gain values in units of 1° from 0° to 90° may be stored in the gain compensation table 330.

The sight line of the driver is tracked using the camera 100 and then an angle in the horizontal direction between the sight line of the driver and the display 200 may be determined.

Comparing a case in which the angle in the horizontal direction is 30° with a case in which it is 45°, the driver is positioned farther away from the center of the display 200 in the case of 30° than in the case of 45°. That is, color shift may become serious when the angle in the horizontal direction is 30°. Accordingly, gain values of the gain compensation table 330 may be set to be larger in the case of 30°. At the time of color shift compensation for an angle in the horizontal direction thereof, the gain applying unit 314 can apply the gain value corresponding to the angle in the horizontal direction between the display 200 and the sight line of the driver to only one line.

Figure 6:
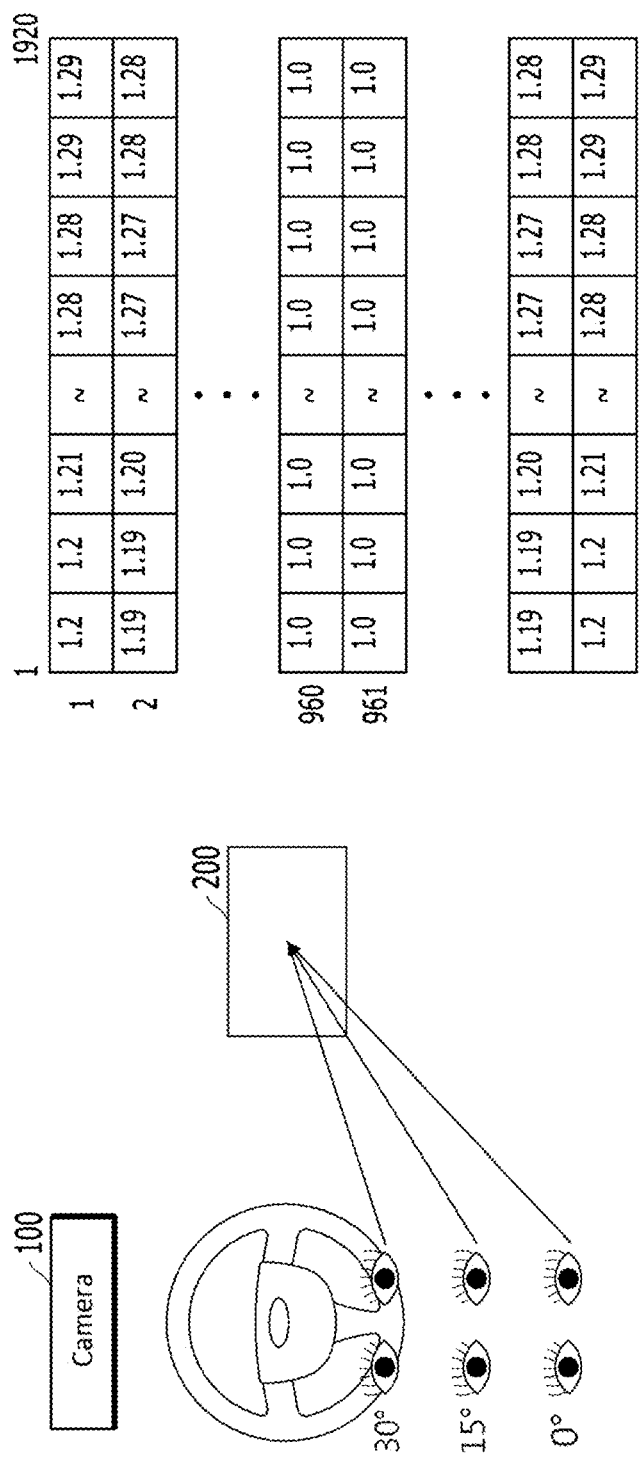
FIG. 6 is a diagram for describing a method of compensating for image data through an image display method according to various exemplary embodiments of the present invention.

FIG. 6 is a diagram for describing a method of compensating for image data through an image display method according to various exemplary embodiments of the present invention and illustrates a case in which colors are compensated in the vertical direction thereof.

The sight line of the driver is tracked using the camera 100 and then an angle in the vertical direction between the sight line of the driver and the display 200 may be determined. FIG. 6 illustrates cases in which the angle of the position of the head of the driver changes to 0°, 15° and 30° in the vertical direction with an angle between the sight line of the driver and the display 200 fixed to 45°.

When horizontal and vertical compensation is required, 180 gain values in units of 1° from −90° to 90° in the vertical direction may be set in the gain compensation table 330. Accordingly, color compensation is possible at 0° to 90° in the horizontal direction and −90° to 90° in the vertical direction according to combinations of 90 gain values in the horizontal direction and 180 gain values in the vertical direction thereof. The gain compensation table 330 of FIG. 6 illustrates a gain table applied when the angle between the sight line of the driver and the display is 45° to the left and a height angle in the vertical direction is 0° in a display with a resolution of 1920×1920. When vertical and horizontal compensation is performed in this manner, a gain may be applied per frame to perform color compensation.

FIG. 7 is a diagram for describing a method of compensating for image data through an image display method according to various exemplary embodiments of the present invention and illustrates a method for preventing generation of a sense of difference due to abrupt color compensation when the position of the driver rapidly changes.

When at least one of an angle in the horizontal direction between the display and the sight line of the driver and an angle in the vertical direction therebetween changes by a reference angle or more than the reference angle within a predetermined time, that is, when the position of the driver rapidly changes, gain values can rapidly increase. Rapid increase in the gain values causes color compensation values to rapidly change so that the driver can perceive rapid color change of image data. In this manner, when display colors rapidly change due to rapid change in the position of the driver, the driver may perceive a sense of difference.

Accordingly, in the various exemplary embodiments of the present invention, image data may be corrected by sequentially controlling gain values by driving frequency steps for one second, as shown in FIG. 7. That is, when compensation values rapidly change, image data may be compensated by sequentially changing gain values per frame for one second instead of reflecting the rapidly changing compensation values in the image data in real time.

Figure 8:
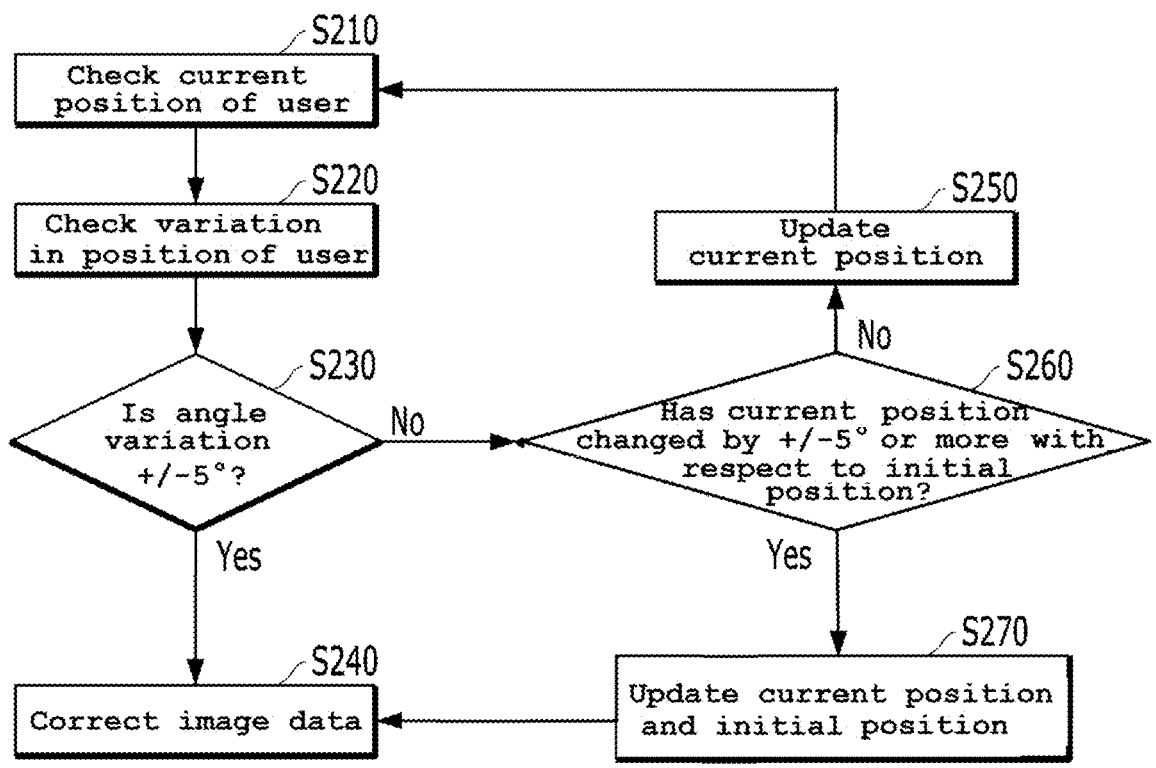
FIG. 8 is a diagram for describing a method of compensating for image data through an image display method according to various exemplary embodiments of the present invention.

FIG. 8 is a diagram for describing a method of compensating for image data through an image display method according to various exemplary embodiments of the present invention and illustrates a method for preventing generation of a sense of difference due to frequent compensation when compensation is applied even when the driver minutely moves.

The display controller 310 can check a current position of the driver (S210) and determine whether the position of the driver changes (S220). Since the sight-line tracking unit 320 tracks the sight line of the driver in real time and outputs tracking results, the display controller 310 can check the current position and a changed position of the driver on the basis of the tracking results of the sight-line tracking unit 320.

The display controller 310 determines whether variation in the sight line of the driver, that is, variation in the angle between the display 200 and the driver, is +/−5° (S230). Here, +/−5° is a reference value used to determine whether to reflect movement of the driver in compensation and may be changed in various manners according to system design methods.

Upon determining that the sight line of the driver has changed by +/−5°, a gain is applied to image data to correct the image data (S240).

Upon determining that the variation is not +/−5°, it is determined whether the current position has changed by +/−5° or more with respect to the initial position (S260).

When the current position has changed by +/−5° or more with respect to the initial position, both the current position and the initial position are updated (S270) and a gain is applied to the image data to correct the image data according to angle variation (S240).

When the current position has changed by less than +/−5° with respect to the initial position, compensation is not performed and the current position of the driver is updated (S250). Accordingly, when minute movements of the driver are accumulated, and when the position of the driver has changed by +/−5° with respect to the initial position, a gain may be applied to the image data to correct the image data.

As described above, the present invention can prevent display colors from being distorted due to a viewing angle problem by compensating for the display colors in real time in a response to the viewing angle of the driver.

In addition, the present invention can prevent expression of unintended colors according to the viewing angle of the driver when a navigation system employing an OLED display is used, and particularly, prevent color shift and luminance deterioration according to the viewing angle and improve color reproducibility and external visibility when an OLED having a microcavity is used.

In addition, the term related to a control apparatus such as "controller", "control unit", "control apparatus" or "control module", etc refers to a hardware apparatus including a memory and a processor configured to execute one or more steps interpreted as an algorithm structure. The memory stores algorithm steps, and the processor executes the algorithm steps to perform one or more processes of a method in accordance with various exemplary embodiments of the present invention. The controller according to exemplary embodiments of the present invention may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors.

The control apparatus may be at least one microprocessor operated by a predetermined program which may include a series of commands for carrying out the method included in the aforementioned various exemplary embodiments of the present invention.

The above-described present invention may be realized as computer-readable code in a medium in which a program is recorded. Computer-readable media include all kinds of recording apparatus in which data readable by computer systems is stored. Examples of computer-readable media include a hard disk drive (HDD), a solid state drive (SSD), a silicon disk drive (SDD), a ROM, a RAM, a CD-ROM, a magnetic tape, a floppy disk, an optical data storage apparatus, etc.

In various exemplary embodiments of the present invention, each operation described above may be performed by a controller, and the controller may be configured by a plurality of controllers, or an integrated single controller.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

In addition, the term of "fixedly connected" signifies that fixedly connected members always rotate at a same speed. Furthermore, the term of "selectively connectable" signifies "selectively connectable members rotate separately when the selectively connectable members are not engaged to each other, rotate at a same speed when the selectively connectable members are engaged to each other, and are stationary when at least one of the selectively connectable members is a stationary member and remaining selectively connectable members are engaged to the stationary member".

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. An image display method for a vehicle, the method comprising:
    tracking a sight line of a driver;
    determining, by a controller, an angle formed between a display and the sight line of the driver;
    loading, by the controller, a gain value corresponding to the determined angle from a prestored gain compensation table;
    applying, by the controller, the loaded gain value to image data displayed on the display; and
    displaying the image data to which the gain value has been applied on the display,
    wherein the tracking of the sight line of the driver includes detecting a position of at least one of the face and pupils of the eyes of the driver from a captured image of the driver and tracking the sight line of the driver,
    wherein the determining of the angle formed between the display and the sight line of the driver includes determining an angle between the sight line of the driver and a center point of the display in at least one of a horizontal direction and a vertical direction,
    wherein the loading of the gain value corresponding to the determined angle from the prestored gain compensation table includes loading a gain value corresponding to at least one of an angle in the horizontal direction and an angle in the vertical direction between the display and the sight line of the driver, and
    wherein the applying of the loaded gain value to the image data displayed on the display includes changing the gain value in a response to a driving frequency of the display and applying the gain value when at least one of the angle in the horizontal direction and the angle in the vertical direction between the display and the sight line of the driver changes by a reference angle or more than the reference angle within a predetermined time.

2. The image display method of claim 1, wherein the applying of the loaded gain value to the image data displayed on the display includes applying the gain value corresponding to the angle in the horizontal direction between the display and the sight line of the driver to only one line.

3. The image display method of claim 1, wherein the applying of the loaded gain value to the image data displayed on the display includes applying the gain value corresponding to the angle in the vertical direction between the display and the sight line of the driver per frame.

4. The image display method of claim 1, wherein the applying of the loaded gain value to the image data displayed on the display includes, when variation in the angle between the display and the sight line of the driver is equal to or greater than the reference angle, applying a gain value in a response to a corresponding angle to the image data displayed on the display.

5. The image display method of claim 4, wherein, upon determining that the variation is not within the reference angle, the controller is configured to determine whether a current position of the driver has changed by the reference angle or more than the reference angle with respect to an initial position of the driver, and upon determining that the current position has changed by the reference angle or more than the reference angle with respect to the initial position, the current position and the initial position of the driver are updated and a gain is applied to the image data to correct the image data according to the variation of the angle.

6. An non-transitory computer-readable recording medium of storing a program for executing the image display method for the vehicle according to claim 1.

7. A vehicle comprising:
a display for displaying image data;
a sight-line tracking unit for tracking a sight line of a driver;
an angle calculation unit configured for determining an angle formed between the display and the sight line of the driver;
a gain compensation table of storing gain values applied in a response to the angle formed between the display and the sight line of the driver; and
a display controller including a processor and configured for loading a gain value corresponding to the angle determined by the angle calculation unit among the stored gain values of the gain compensation table, applying the gain value to the image data and displaying the image data to which the gain value has been applied on the display,
wherein the sight-line tracking unit is configured to detect a position of at least one of the face and pupils of the eyes of the driver from a captured image of the driver and detects the sight line of the driver,
wherein the angle calculation unit is configured to determine an angle between the sight line of the driver and a center point of the display in at least one of a horizontal direction and a vertical direction,
wherein the display controller is configured to load a gain value corresponding to at least one of an angle in the horizontal direction and an angle in the vertical direction between the display and the sight line of the driver, and
wherein the display controller is configured to change the gain value in a response to a driving frequency of the display and is configured to apply the gain value when at least one of the angle in the horizontal direction and the angle in the vertical direction between the display and the sight line of the driver changes by a reference angle or more than the reference angle within a predetermined time.

8. The vehicle of claim 7, wherein the display controller is configured to apply the gain value corresponding to the angle in the horizontal direction between the display and the sight line of the driver to only image data of one line.

9. The vehicle of claim 7, wherein the display controller is configured to apply the gain value corresponding to the angle in the vertical direction between the display and the sight line of the driver to only image data of one frame.

10. The vehicle of claim 7, wherein, when variation in the angle between the display and the sight line of the driver is equal to or greater than the reference angle, the display controller is configured to apply a gain value in a response to a corresponding angle to the image data displayed on the display.

11. The vehicle of claim 10, wherein, upon determining that the variation is not within the reference angle, the controller is configured to determine whether a current position of the driver has changed by the reference angle or more than the reference angle with respect to an initial position of the driver, and upon determining that the current position has changed by the reference angle or more than the reference angle with respect to the initial position, the current position and the initial position of the driver are updated and a gain is applied to the image data to correct the image data according to the variation of the angle.

12. An image display method for a vehicle, the method comprising:
tracking a sight line of a driver;
determining, by a controller, an angle formed between a display and the sight line of the driver;
loading, by the controller, a gain value corresponding to the determined angle from a prestored gain compensation table;
applying, by the controller, the loaded gain value to image data displayed on the display; and
displaying the image data to which the gain value has been applied on the display,
wherein the tracking of the sight line of the driver includes detecting a position of at least one of the face and pupils of the eyes of the driver from a captured image of the driver and tracking the sight line of the driver,
wherein the determining of the angle formed between the display and the sight line of the driver includes determining an angle between the sight line of the driver and a center point of the display in at least one of a horizontal direction and a vertical direction,
wherein the loading of the gain value corresponding to the determined angle from the prestored gain compensation table includes loading a gain value corresponding to at least one of an angle in the horizontal direction and an angle in the vertical direction between the display and the sight line of the driver,
wherein the applying of the loaded gain value to the image data displayed on the display includes, when variation in the angle between the display and the sight line of the driver is equal to or greater than the reference angle, applying a gain value in a response to a corresponding angle to the image data displayed on the display,
wherein, upon determining that the variation is not within the reference angle, the controller is configured to determine whether a current position of the driver has changed by the reference angle or more than the reference angle with respect to an initial position of the driver, and upon determining that the current position has changed by the reference angle or more than the reference angle with respect to the initial position, the current position and the initial position of the driver are updated and a gain is applied to the image data to correct the image data according to the variation of the angle.

13. A vehicle comprising:
a display for displaying image data;
a sight-line tracking unit for tracking a sight line of a driver;
an angle calculation unit configured for determining an angle formed between the display and the sight line of the driver;
a gain compensation table of storing gain values applied in a response to the angle formed between the display and the sight line of the driver; and
a display controller including a processor and configured for loading a gain value corresponding to the angle determined by the angle calculation unit among the stored gain values of the gain compensation table, applying the gain value to the image data and displaying the image data to which the gain value has been applied on the display, wherein the sight-line tracking unit is configured to detect a position of at least one of the face and pupils of the eyes of the driver from the captured image of the driver and detects the sight line of the driver, wherein the angle calculation unit is configured to determine an angle between the sight line of the driver and a center point of the display in at least one of a horizontal direction and a vertical direction, wherein the display controller is configured to load a gain value corresponding to at least one of an angle in the horizontal direction and an angle in the vertical direction between the display and the sight line of the driver, wherein, when variation in the angle between the display and the sight line of the driver is equal to or greater than the reference angle, the display controller is configured to apply a gain value in a response to a corresponding angle to the image data displayed on the display, and wherein, upon determining that the variation is not within the reference angle, the controller is configured to determine whether a current position of the driver has changed by the reference angle or more than the reference angle with respect to an initial position of the driver, and upon determining that the current position has changed by the reference angle or more than the reference angle with respect to the initial position, the current position and the initial position of the driver are updated and a gain is applied to the image data to correct the image data according to the variation of the angle.

* * * * *